Figure 1:
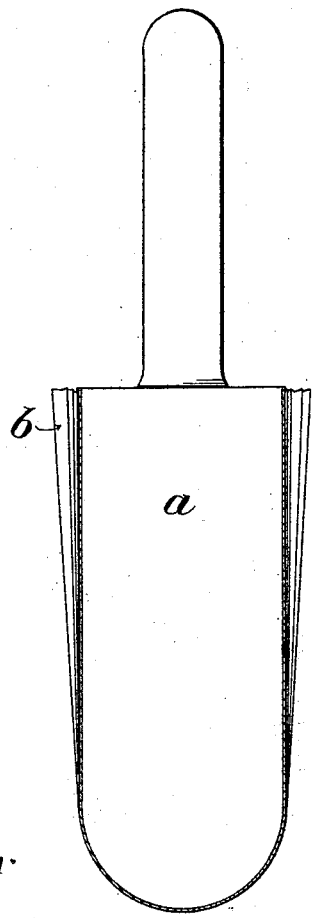

(No Model.)

H. SALZER.
PACKING VESSEL AND METHOD OF PRESERVING FOOD ARTICLES.

No. 528,649.  Patented Nov. 6, 1894.

Witnesses.
W. R. Edelin
Geo. Ewis

Inventor.
Henry Salzer
by Pollok & Mauro
his attorneys

UNITED STATES PATENT OFFICE.

HENRY SALZER, OF BALTIMORE, MARYLAND.

PACKING-VESSEL AND METHOD OF PRESERVING FOOD ARTICLES.

SPECIFICATION forming part of Letters Patent No. 528,649, dated November 6, 1894.

Application filed June 8, 1894. Serial No. 513,945. (No model.)

*To all whom it may concern:*

Be it known that I, HENRY SALZER, of Baltimore, Maryland, have invented a new and useful Improvement in Packing-Vessels for Preserving Food Articles, which is fully set forth in the following specification.

The present invention relates to the preservation in tin cans of meats, fruit, vegetables and other food articles, and its object is to protect such articles not only from contact with the metallic surface of the can, but also from contamination by the metallic compounds which form and precipitate in the can.

Investigations conducted by the health officials of the city of Paris have revealed the presence of lead in canned goods of the best quality (where the finest tin is used) in quantity sufficient to prove very injurious to health; and it is well established that serious nervous disorders are produced by this cause in persons who make free use of canned goods.

My own investigations have shown that the metal found in canned foods (which is almost always lead) does not enter the food in the form of soluble salts, but in that of insoluble lead or lead sulphide. The latter compound is very readily formed since nearly all food articles contain sulphur. These two principal impurities are strictly insoluble in the liquids contained in the can, and the closest investigations fail to disclose the presence of any soluble metallic compounds in the various canned goods on the market. These facts have an important bearing upon the invention.

Attempts have been made heretofore to improve the wholesomeness of canned goods (particularly of shrimps and other shell fish) by lining the cans with cotton, muslin or other textile fabrics, or with asphaltum, perforated paper, and other materials. The main objection to cement and plaster linings is that these substances have constituents that are soluble in water (particularly at a high sterilizing temperature) and such substances as paraffine, asphaltum, &c., will melt at the temperature to which the contents of the can are subjected for effective sterilization, and are therefore unsuitable to the purpose. Linings of paper and textile fabrics, which have been tried, serve to keep the food articles out of contact with the surface of the can; but the precipitated lead compounds held in suspension in the liquid pass readily through these porous media. Furthermore, ordinary paper is rendered practically useless by the action of the boiling liquid, and in any case bags or inclosures formed of separate pieces glued or pasted together separate during the sterilizing operation. I have found that all of these objections are completely obviated and the purposes of this invention fully accomplished, by the use of vegetable parchment-paper (prepared with sulphuric acid and completely washed out). This material forms an impassable barrier to all but soluble crystallizable metallic salts, the insoluble salts which alone are present in canned articles, being incapable of passing through it. Steam passes through it without impediment in the sterilizing process, but even at that time insoluble salts, even in the finest state of subdivision, cannot pass. Moreover, this material is not affected in any way by the liquids or other contents of the can, or by heating process, and retains its power of resisting for indefinite times, whether wet or dry. By applying the lining, as hereinafter described, in a continuous sheet the protection of the food article from metal poisons is insured, provided of course, there is no hole or break in the tissue.

The following description, taken in connection with the accompanying drawings, which form part of this specification, will enable persons skilled in the art to which the invention relates to understand the principal thereof, as well as the manner in which the same has been carried out in practice.

Figure 2:
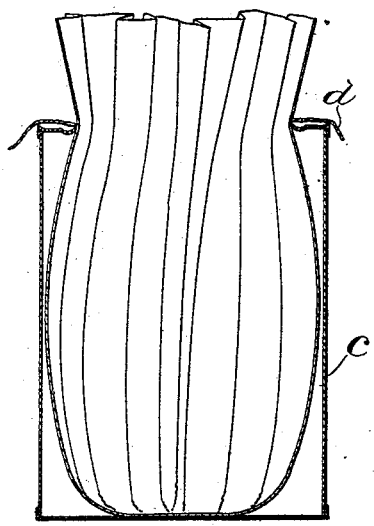
Figure 3:
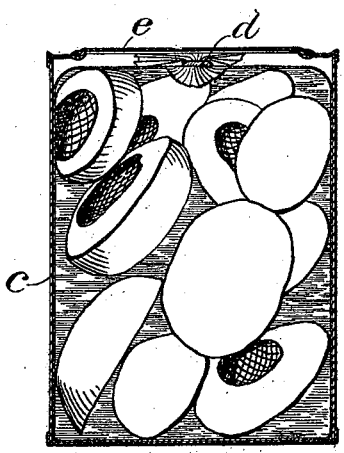

Figure 1 is a longitudinal section of a mandrel or former and a parchment-paper envelope applied thereto. Fig. 2, is a similar view of a can after the lining has been applied; and Fig. 3, is a similar view of the can closed and ready for the market.

In the drawings *a* represents a mandrel or former rounded at the end, having a diameter of proper size to permit it to enter the mouth of the can, and having its thick portion somewhat longer than the depth of the can. A disk of parchment paper is prepared and thoroughly wetted in hot water by holding it at the edges, thus at the same time testing its waterproof quality. In this wetted condition it is very pliable, without loss of strength, and can be readily shaped to the form of the can. The sheet or disk is then gathered up, umbrella-like, as shown at $b$, Fig. 1, around the mandrel $a$, its diameter being such that it forms in this position a bag deeper by about two and one-half inches than the depth of the can $c$ (Figs. 2 and 3) in which it is introduced while on the mandrel. By means of the latter, or by admitting water under pressure, the paper can be brought closely against the inner walls of the can, leaving a margin projecting outside the latter to admit of lapping over the contents of the can and forming a complete inclosure whose continuity is uninterrupted. The extra folds of paper, due to the manner in which it is applied, are thus at the top of the can, where the solder is supplied, and where the greatest protection against lead is required. After the can has been filled a strong twine $d$ is used to tie tightly the mouth of the bag, but this is not done immediately. The twine is put in position, but not tied until after the first dip, that is, until after the can has been exposed to a boil for one or two minutes in the open water kettle, so as to expel all air. The bag is then tightly tied, the cap $e$ put on, and the sterilizing process completed in the usual way.

When the can is opened its contents can be removed if desired, by taking out the entire paper lining as a whole.

The procedure described is that which has been found in practice to be easily carried out, effective and satisfactory in every way. At the same time it will be evident that modifications and departures may be made therein without departing from the spirit of the invention For example, the continuous lining of parchment paper may be formed by stamping or by any other equivalent method.

I claim as my invention—

1. A packing vessel or inclosure for food articles comprising a metallic can and an inclosed envelope or lining formed of a sheet of parchment paper, substantially as described.

2. A packing vessel for food articles comprising a metallic can and an inner envelope formed of a continuous sheet of parchment paper having its edges drawn together at the top and firmly tied or united, the paper envelope being removable from the can, substantially as described.

In testimony whereof I have signed this specification in the presence of two subscribing witnesses.

HENRY SALZER.

Witnesses:
LEE PURCELL,
A. W. BRADFORD.